(12) United States Patent
Kawasaki

(10) Patent No.: US 7,921,181 B2
(45) Date of Patent: Apr. 5, 2011

(54) INFORMATION PROCESSING DEVICE, INFORMATION PROCESSING METHOD, AND COMPUTER PROGRAM

(75) Inventor: Makoto Kawasaki, Tokyo (JP)

(73) Assignee: Sony Corporation, Tokyo (JP)

(*) Notice: Subject to any disclaimer, the term of this patent is extended or adjusted under 35 U.S.C. 154(b) by 1023 days.

(21) Appl. No.: 10/580,586

(22) PCT Filed: Nov. 12, 2004

(86) PCT No.: PCT/JP2004/016866
§ 371 (c)(1),
(2), (4) Date: May 25, 2006

(87) PCT Pub. No.: WO2005/059756
PCT Pub. Date: Jun. 30, 2005

(65) Prior Publication Data
US 2009/0019240 A1    Jan. 15, 2009

(30) Foreign Application Priority Data
Dec. 15, 2003 (JP) .................................. 2003-416627

(51) Int. Cl.
*G06F 12/00* (2006.01)
(52) U.S. Cl. ........ 709/217; 709/218; 709/219; 711/115; 711/154
(58) Field of Classification Search .................. 711/115, 711/154; 709/217–219
See application file for complete search history.

(56) References Cited

U.S. PATENT DOCUMENTS

| | | | |
|---|---|---|---|
| 2003/0009667 A1* | 1/2003 | Horiuchi et al. | 713/168 |
| 2003/0079038 A1 | 4/2003 | Robbin et al. | |
| 2003/0135748 A1* | 7/2003 | Yamada et al. | 713/193 |
| 2003/0144918 A1 | 7/2003 | Novelli et al. | |

FOREIGN PATENT DOCUMENTS

| | | |
|---|---|---|
| JP | 2002-182659 | 6/2002 |
| JP | 2002-189908 | 7/2002 |
| JP | 2002-288142 | 10/2002 |
| JP | 2003-29795 | 1/2003 |
| JP | 2003-122660 | 4/2003 |
| JP | 2003-263175 | 9/2003 |
| JP | 2004-515863 | 5/2004 |
| WO | WO 01/38993 A1 | 5/2001 |
| WO | 02/47352 | 6/2002 |

* cited by examiner

*Primary Examiner* — Jasmine Song
(74) *Attorney, Agent, or Firm* — Oblon, Spivak, McClelland, Maier & Neustadt, L.L.P.

(57) ABSTRACT

An information processing apparatus and method for enabling efficient content download and transfer processing operations are provided. In downloading content, a content identifier thereof is acquired, a particular piece of content subject to transfer to an external device is identified on the basis of the acquired content identifier, the identified content is retrieved from a data storage block, and the retrieved content is transferred to the external device or written to an information recording medium, so that the processing of content downloading, the processing of content transfer to an external device and content writing to an information recording medium such as CD can be executed as a sequence of processing operations, thereby providing significantly efficient content download and content transfer or content write processing operations.

39 Claims, 12 Drawing Sheets

FIG. 3A

| ID | TITLE/ALBUM NAME | ARTIST NAME | ARTIST INITIAL | GENRE | MUSIC FILE NAME |
|---|---|---|---|---|---|
| 1 | Album A | Jamiroquai | J | Funk | |
| 2 | Song-A | Jamiroquai | J | Funk | C:¥Root¥Song-A¥track.omg |
| 3 | Song-B | Jamiroquai | J | Funk | C:¥Root¥Song-B¥track.omg |
| 4 | Album B | The Beatles | B | Rock | |
| 5 | Song-C | The Beatles | B | Rock | C:¥Root¥Song-C¥track.omg |
| 6 | Album C | Miles Davis | M | Jazz | |
| 7 | Sonc-D | Miles Davic | M | Jazz | C:¥Root¥Song-D¥track.wav |
| .. | .. | .. | .. | .. | .. |

FIG. 3B

| ID | PARENT ID |
|---|---|
| 2 | 1 |
| 3 | 1 |
| 5 | 4 |
| 7 | 6 |
| .. | .. |

FIG. 11
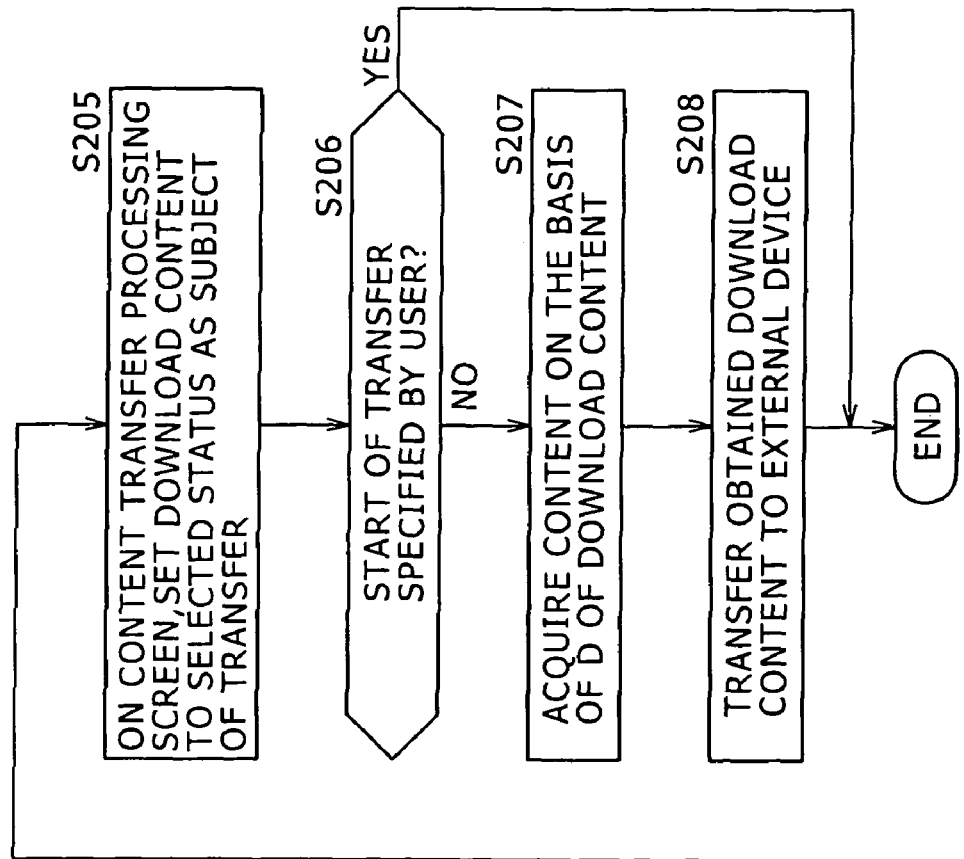
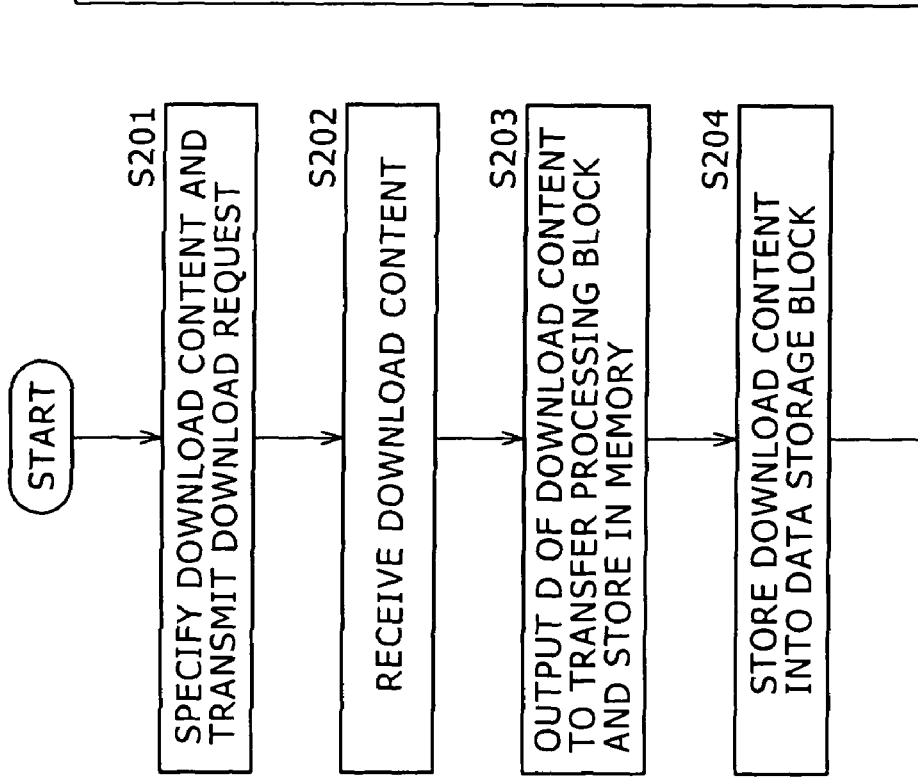

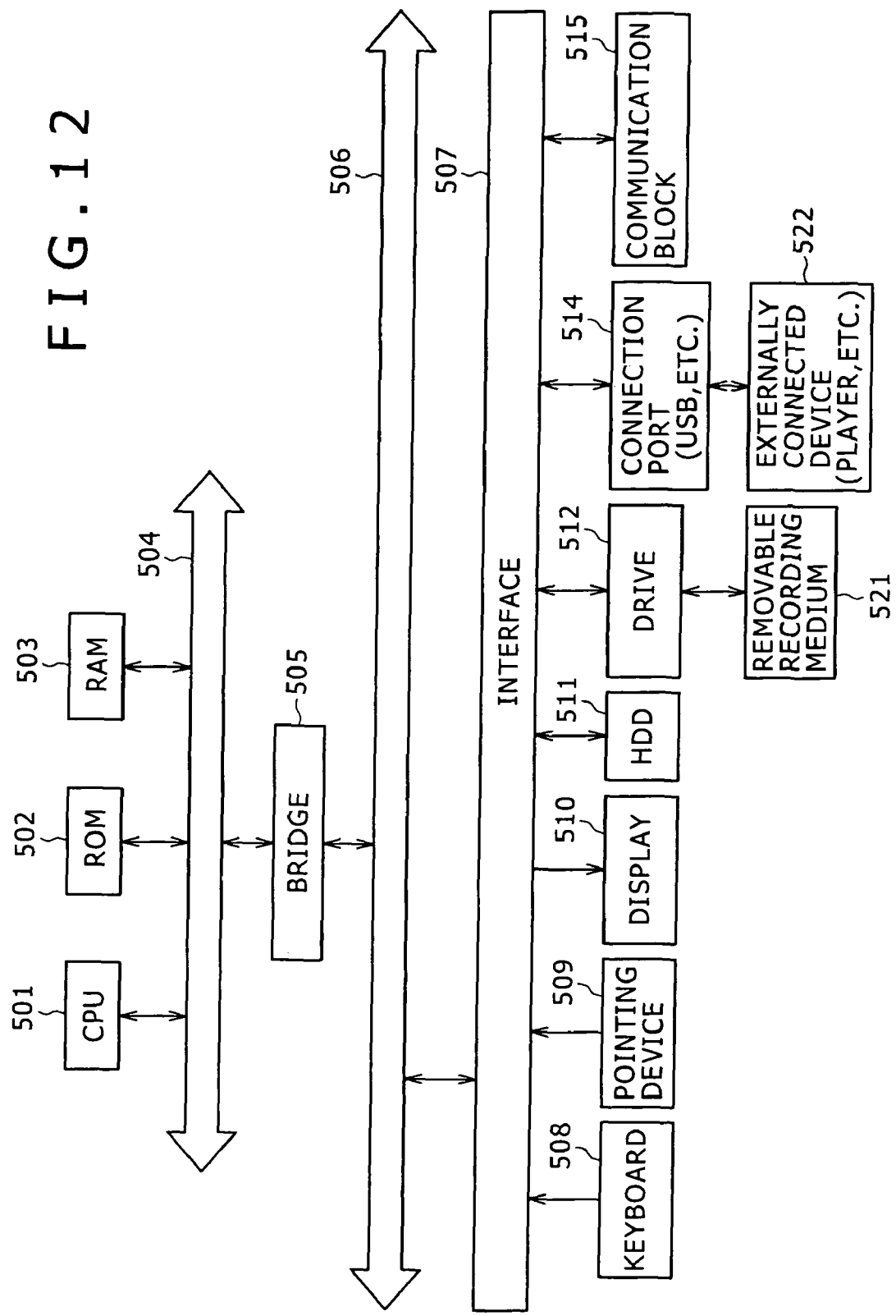

INFORMATION PROCESSING DEVICE, INFORMATION PROCESSING METHOD, AND COMPUTER PROGRAM

TECHNICAL FIELD

The present invention relates generally to an information processing apparatus, and information processing method, and a computer program. More particularly, the present invention relates to an information processing apparatus, an information processing method, and a computer program for efficiently executing, in a configuration for storing music content into a storage block such as a hard disk unit for management, the processing of downloading content from a music distribution server for example and the processing of transferring downloaded content to an external device such as a portable device (PD) for example as a sequence of processing operations.

BACKGROUND ART

Recently, information processing devices such as PCs having mass storage blocks including high-capacity hard disk drives and DVDs and such as portable devices have been spreading, allowing many content users to store and manage masses of content such as music data and image data in storage means. These kinds of data are stored as digital data compressed by MP3, ATRAC, and other data compression algorithms and then encrypted as required for management.

Also, a content use form has been gaining popularity in which music content is downloaded from a networked music distribution server, an EMD (Electronic Music DISTRIBUTION) server as a music distribution server for example, and the downloaded music content is stored in a recording medium of a PC to be outputted (checked out) to a user's portable device (PD) as required for content reproduction.

SonicStage (trademark), SonicStage Simple Burner (trademark), MGIQLIP (trademark), Windows Media Player (trademark), Real Player (trademark), and iTunes (trademark), for example, are known as typical jukebox application programs for executing the management and reproduction of the above-mentioned content and the control of transfer thereof to external devices such as a portable device (PD). Each of these application programs has capabilities of downloading EMD content and transferring music data from a hard disk (HD) of a PC to devices and media connected thereto.

The above-mentioned existing applications are each configured to execute (a) the processing of downloading content and storing the downloaded content into a hard disk (HD) of a PC; and (b) the processing of transferring the content from the hard disk (HD) of the PC to external devices and media that are portable memories.

However, the above-mentioned existing applications are not configured to execute the download processing and the transfer processing as a sequence of processing operations.

Therefore, if the user wants to download content from a content server such as an EMD server and transfer the downloaded content to external devices or media, the user must go through a procedure of executing a download processing execution program, storing the downloaded content into the hard disk, retrieving a content group stored in the hard disk for the downloaded content, selecting the retrieved downloaded content as the content subject to transfer, and transferring the selected content to external devices or media. In some cases, the user must execute download processing and content transfer processing by use of two different applications, thereby significantly increasing the operation load of the user.

Above-mentioned iTunes of Apple Computer, Inc., one of juke box applications, has a capability of providing synchronization with ipod (AutoSync), a portable device (PD) marketed by Apple Computer, Inc. When music data is newly added to the content database, namely, the hard disk of a PC by EMD content downloading or CD ripping for example, this capability makes a comparison between the content stored in the PC and the music data stored in an ipod that is a portable device (PD) and transfers the music data that is found in the hard disk (HD) of the PC but not found in the ipod, thereby making identical the music data stored in both devices. It should be noted that the ipod and the synchronization capability (AutoSync) are described in Non-patent Document 1 and Non-patent Document 2.

Use of the above-mentioned capability allows the automatic transfer to the music data downloaded to the hard disk (HD) of the PC to the ipod. However, this capability cannot be realized but with a mass storage PD to which all music data in the HD such as the ipod can be transferred. Neither this capability can realize the processing of selectively transferring only particular music data from the hard disk of the PC. Especially, it is difficult for the synchronization capability of iTunes of Apple Computer, Inc. to select only the currently downloaded data to transfer the selected data to a portable device.

[Non-patent Document 1]
http://www.apple.co.jp/ipod/
[Non-patent Document 2]
http://www.apple.co.jp/ipod/autosync.html

DISCLOSURE OF INVENTION

Problems to be Solved by the Invention

It is therefore an object of the present invention to provide an information processing apparatus, an information processing method, and a computer program for realizing the efficient downloading and transfer or writing of content by executing the processing of downloading content from a server, transferring downloaded content to an external device such as a portable device, and writing data to an information recording medium such as a CD as a sequence of processing operations.

Means for Solving the Problems

In carrying out the invention and according to a first aspect thereof, there is provided an information processing apparatus. This apparatus has a data processing block for executing processing of downloading content and processing of transferring content to an external device; and a data storage block for storing downloaded content, wherein the data processing block stores downloaded content into the data storage block, holds a content identifier of downloaded content in a memory, and, on the basis of the content identifier, identifies content subject to transfer to an external device.

In one embodiment of the information processing apparatus according to the invention, the data processing block displays data with information about content transferable to an external device set as a list, sets an entry corresponding to downloaded content to the list, and executes a display operation with the entry set as transfer-specified content beforehand.

In one embodiment of the information processing apparatus according to the invention, the data processing block stores downloaded content into the data storage block, acquires content from a data storage block on the basis of the content identifier of downloaded content held in the memory, and transfers the acquired content to an external device.

In one embodiment of the information processing apparatus according to the invention, the data processing block acquires content from a data storage block on the basis of the content identifier of downloaded content held in the memory and transfers the acquired content to an external device under a condition of a user transfer instruction input.

In one embodiment of the information processing apparatus according to the invention, the data processing block acquires content from a data storage block on the basis of the content identifier of downloaded content held in the memory and transfers the acquired content to an external device regardless of a user transfer instruction input.

In one embodiment of the information processing apparatus according to the invention, the data processing block has a content management processing block for executing content download processing; a content transfer processing block for executing content transfer processing; and a music management block for storing content into a data storage block and acquiring content from the music management block, the content management processing block outputs a content identifier corresponding to downloaded content to the content transfer processing block and the content transfer processing block outputs the content identifier to the music management block, acquires content corresponding to the content identifier from the music management block, and transfers the acquired content to an external device.

In one embodiment of the information processing apparatus according to the invention, the data processing block acquires a content file name on the basis of a content identifier of downloaded content and acquires a content file corresponding to content downloaded from a data storage block on the basis of the content file name.

In one embodiment of the information processing apparatus according to the invention, the data processing block identifies content to be written to an information recording medium on the basis of the content identifier.

In one embodiment of the information processing apparatus according to the invention, the data processing block displays data with information about content writable to an information recording medium set as a list, sets an entry corresponding to downloaded content to the list, and executing a display operation with the entry set as write-specified content beforehand.

In carrying out the invention and according to a second aspect thereof, there is provided an information processing method for downloading content and transferring content to an external device. This method has a content storage step of executing process for storing downloaded content to a data storage block; and a transfer content identification step of holding a content identifier of downloaded content in a memory, and, on the basis of the content identifier, executing process for identifying content subject to transfer to an external device.

In one embodiment of the information processing method according to the invention, the information processing methods further has a display step of displaying data with information about content transferable to an external device set as a list, wherein a list with the entry corresponding to downloaded content set as transfer-specified content beforehand is displayed in the display step.

In one embodiment of the information processing method according to the invention, this method further has a content transfer step of acquiring content from a data storage block on the basis of the content identifier of downloaded content held in the memory to transfer the acquired content to an external device.

In one embodiment of the information processing method according to the invention, this method further has a step of detecting a user transfer instruction input; and a content transfer step of acquiring content from a data storage block on the basis of the content identifier of downloaded content held in the memory under a condition of a user transfer instruction input to transfer the acquired content to an external device.

In one embodiment of the information processing method according to the invention, this method further has a step of acquiring a content file name on the basis of a content identifier corresponding to downloaded content; and a step of acquiring a content file corresponding to content downloaded from a data storage block on the basis of the content file name.

In one embodiment of the information processing method according to the invention, this method further has a step of executing process for identifying content to be written to an information recording medium on the basis of the content identifier.

In one embodiment of the information processing method according to the invention, data with information about content writable to an information recording medium set as a list is displayed, an entry corresponding to downloaded content to the list is set, and a display operation with the entry set as write-specified content beforehand is executed.

In carrying out the invention and according to a third aspect thereof, there is provided a computer program for downloading content and transferring content to an external device. This computer program has a content storage step of executing process for storing downloaded content to a data storage block; and a transfer content identification step of holding a content identifier of downloaded content in a memory, and, on the basis of said content identifier, identifying content subject to transfer to an external device.

It should be noted that the computer program according to the invention is providable to computer systems capable of executing various program codes, by means of computer-readable recording media, communication media, recording media such as CD, FD, and MO for example, and communication media such as networks. Providing these programs in a computer-readable format allows the realization of the processing in accordance with the programs on computer systems.

Many other features, advantages, and additional objects of the present invention will become manifest to those versed in the art upon making reference to the detailed description which follows and the accompanying sheet of drawings. It should also be noted that term "system" as used herein denotes a logical set of a plurality of component units and these component units are not necessary accommodated in a same housing.

Effect of the Invention

According to the configuration of the invention, the processing of downloading content from a content server, the processing of transferring the downloaded content to an external device such as a portable device, and the processing of writing data to an information recording medium such as a CD can be executed as a sequence of processing operations, thereby providing significantly efficient content download and content transfer or content write processing operations.

Further, according to the configuration of the invention, in downloading content, a content identifier thereof is acquired, a particular piece of content subject to transfer to an external device is identified on the basis of the acquired content identifier, the identified content is retrieved from a data storage block, and the retrieved content is transferred to the external device or written to an information recording medium, so that the processing of content downloading, the processing of content transfer to an external device and content writing to an information recording medium can be executed as a sequence of processing operations, thereby providing significantly efficient content download and content transfer or content write processing operations.

Still further, according to the configuration of the invention, in display data with the information about the content transferable to external devices or the information about the content writable to information recording media set in the form of a list, the displaying of a list with the entries corresponding to download content set as transfer-specified content or write-specified content beforehand is executed, so that download content search processing need not be executed, thereby enabling significantly efficient processing.

BRIEF DESCRIPTION OF THE DRAWINGS

FIGS. 3A and 3B show an album/music table and an ID table, respectively.

FIG. 11 is a flowchart indicative of a procedure of downloading and transferring content data to be executed in the above-mentioned information processing apparatus according to the invention.

FIG. 12 is a block diagram illustrating an exemplary hardware configuration of the above-mentioned information processing apparatus according to the invention.

BEST MODE FOR CARRYING OUT THE INVENTION

Figure 1:
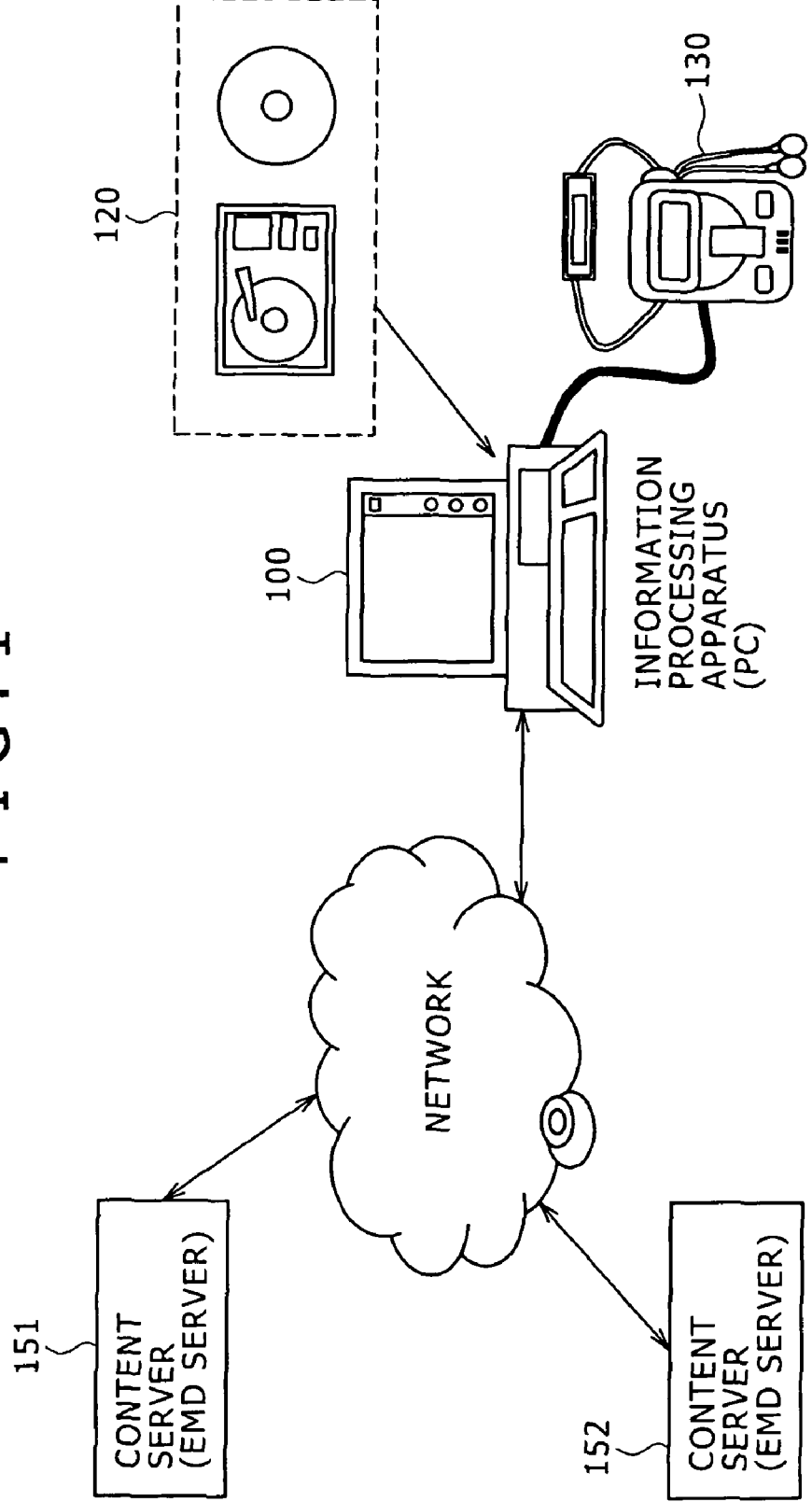
FIG. 1 is a schematic diagram illustrating a use form of an information processing apparatus practiced as one embodiment of the invention for executing downloading and transferring content data.

Now, referring to FIG. 1, there is shown a use form of an information processing apparatus practiced as one embodiment of the present invention for downloading content data and transferring the downloaded content data to a portable device (PD). An information processing apparatus 100 is made up of a personal computer, for example, and has a data storage block 120 for storing music data and management information, for example. The information processing apparatus 100 is connected to a network based on a local area network or the Internet, for example.

The information processing apparatus 100 records, to the data storage block 120, music content received from content servers 151, 152 such as a networked EMD (Electronic Music Distribution) server or music content read from information recording media such as a CD (Compact Disc). It should be noted that the data to be recorded is encoded by MP3 or ATRAC3 data compression algorithm and then encrypted by some encryption algorithm, as required.

The content servers 151, 152 transmit music data as content, attribute information such as album name and artist name corresponding to the content, music title and music length information to be stored in the album, right information associated with the use of the content, and additional information such as jacket image and lyrics information via a network in response to a request by the information processing apparatus 100. The information processing apparatus 100 stores the content downloaded from these servers into the data storage block 120 along with various attribute information such as album name, artist name, and music length information according to the downloaded content, the right information and the additional information.

The right information includes information such as check-out count that limits the number of portable devices (PDs) that can simultaneously use content corresponding to that right information and information telling whether or not the content may be copied. It should be noted that the portable device (PD) described below generically refers to a player and a medium such as flash memory and generally includes a device having a storage block for storing content and a control block for executing data transfer control processing.

The information processing apparatus 100 is capable to outputting (or checking out) content to a portable device 130 along with content-associated management information and right information via a USB cable for example. It should be noted that this check-out processing is executed on the basis of the right information corresponding to that content.

Figure 2:
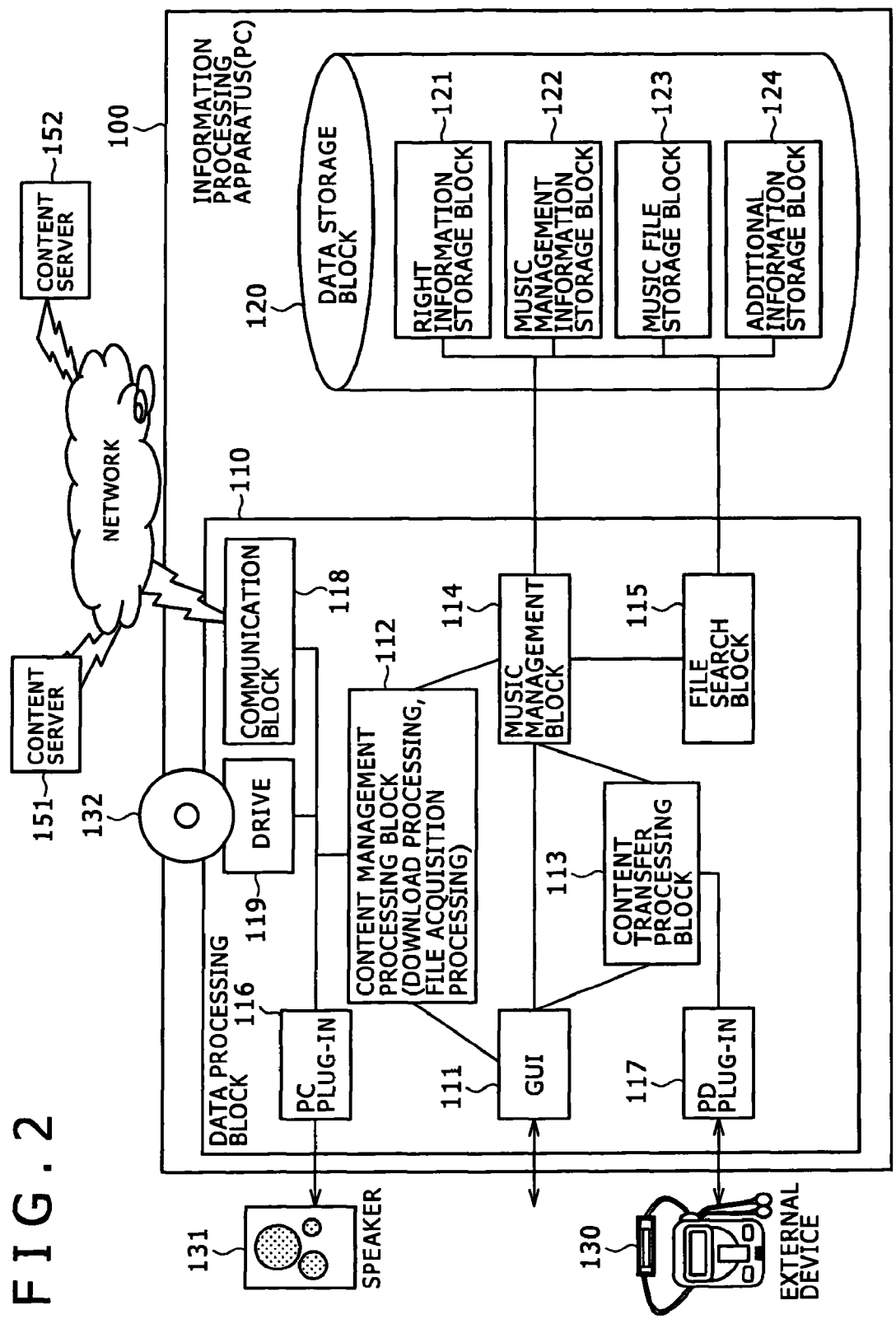
FIG. 2 is a schematic diagram illustrating processing capabilities of the above-mentioned information processing apparatus according to the invention.

The following describes processing capabilities of the information processing apparatus according to the present invention with reference to FIG. 2. The information processing apparatus 100 has a data processing block 110 and a data storage block 120. The data processing block 110 has a GUI block 111, a content management processing block 112, a content transfer processing block 113, a music management block 114, a file search block 115, a PC plug-in 116, a PD plug-in 117, a communication block 118, and a drive 119. The data storage block 120 contains a right information storage block 121, a music management information storage block 122, a music file storage block 123, and an additional information storage block 124.

The data processing block 110 is configured by a CPU for executing data processing as instructed by computer programs and a RAM and a ROM for storing programs and parameters, for example. A specific hardware configuration will be described later. The following describes details of each of the blocks shown in FIG. 2.

It should be noted that the processing capabilities described below are mainly the processing capabilities associated with the present invention with emphasis placed on content download and transfer processing capabilities.

The GUI (Graphical User Interface) block 111 generates various data input/output screens and presents them on a display monitor. The GUI block 111 functions not only as a data input block corresponding to keyboard and mouse operations done by a user, but also as a data output block for displaying various kinds of information including content information, content reproduction status information, content download information, and content transfer status information.

In content download processing, the GUI block 111 enters download specification information entered by the user, a content URL for example, into the content management processing block 112.

On the basis of the content specification information (a URL for example) entered from the GUI block 111, the content management processing block 112 connects to the content servers 151, 152 via a network to execute the processing of acquiring the specified content. The acquired content is stored in the music file storage block 123 of the data storage block 120 via the music management block 114. This processing is content download processing.

It should be noted that, along with the substantial data of content, the acquisition of the attribute information thereof, title, album name, and artist name for example, is also executed. These kinds of information are also stored in the music management information storage block 122. Further, the right information as content use right information is also acquired and stored in the right information storage block 121 as required. In addition, a jacket image and lyrics data are stored in the additional information storage block 124.

The main function of the content management processing block 112 is control of content download processing, content acquisition processing, and content reproduction processing.

The content management processing block 112 executes the processing of downloading the specified content from the content servers 151, 152 via the communication block 118 on the basis of the content specification information, URL information for example, specified by the user and the processing of inputting content from an information recording medium 132 loaded on the drive 119. The downloaded content or the input content is stored in the music file storage block 122 of the data storage block 120 via the music management block 114.

Also, the content management processing block 112 executes content reproduction control, thereby outputting, to the music management block 114, a content identifier (or content ID) as content specification information in response to a reproduction request entered through the GUI block 111. The music management block 114 acquires a file name corresponding to the content identifier (content ID) and provides a music file acquired as a result of a file search operation executed in the file search block 115 to the content management processing block 112. The content management processing block 112 executes control of reproducing the acquired content file. It should be noted that, in this reproduction control, reproduction control based on the right information about the content is executed.

In response to the user input through the GUI block 111 for example, the music management block 114 executes the processing of acquiring various kinds of data stored in the data storage block 120; for example, the acquisition of music management information, the acquisition of music files, the acquisition of right information, or the acquisition of additional information such as a jacket image and lyrics information. For example, if a request for acquiring music information comes through the GUI block 111, the music management block 114 acquires such content information as content ID, album name, title, artist name, and artist initial from the music management information storage block 122 of the data storage block 120 in response to the user request and provides the acquired information to the GUI block 111, which presents the provided information on the monitor display.

When the user selects a particular piece of content from the content information resented on the display monitor and enters a request for reproduction, then the GUI block 111 supplies the music ID corresponding to the content requested for reproduction to the content management processing block 112, thereby requesting the reproduction of the content. The content reproduction is executed through the PC plug-in 116.

In the content reproduction processing, the music management block 114 acquires a file name corresponding to the music ID from the music management information storage block 122 and makes the file search block 115 execute file acquisition processing on the basis of the acquired file name, thereby acquiring a content file from the music file storage block 123. The music management block 114 outputs the acquired music file to the content management processing block 112. The content management processing block 112 outputs the supplied content to an externally connected output device (a speaker 131 for example) through the PC (Protected Content) plug-in 116.

It should be noted that, in the content reproduction processing, the content is decrypted in accordance with the encryption and encoding forms of the content and the decrypted content is reproduced.

When a request for content output processing (check-out) to the external device 130 such as a portable device (PD) or content input processing (check-in) from the external device 130 is made by the user through the GUI block 111, the GUI block 111 supplies a music ID corresponding to the transfer requested content to the content transfer processing block 113, thereby requesting the transfer of the content. The content transfer processing is executed via the PD plug-in 117.

Receiving the music ID from the GUI block 111, being requested for the transfer of the content, the content transfer processing block 113 supplies the music ID to the music management block 114. The music management block 114 acquires a file name corresponding to the music ID from the music management information storage block 122 and makes the file search block 115 execute a file acquisition processing on the basis of the file name, thereby acquiring a content file from the music file storage block 123. The music management block 114 outputs the acquired music file to the content transfer processing block 113. The content transfer processing block 113 supplies the acquired content to the PD plug-in 117. The PD plug-in 117 executes the content transfer if cross authentication with the external device 130 such as a portable device is successful.

The music management block 114 executes the acquisition, update, or deletion of data on the data storage block 120 in accordance with a processing request from the GUI block 111, the content management processing block 112, and the data storage block 120.

For example, on the basis of the music ID specified from the content management processing block 112 or the content transfer processing block 113, the music management block 114 acquires a content file name corresponding to the music ID from the content management information stored in the music management information storage block 122 and, on the basis of the file name, outputs a search instruction for search for a music file to the file search block 115. The file search block 115 provides the music file retrieved from the music file storage block 123 to the content management processing block 112 or the content transfer processing block 113.

Further, the music management block 114 inputs the content downloaded by the content management processing block 112 from an external server and the content entered from an information recording medium such as a CD into the data storage block 120.

In this data storage processing, a content file compliant with a data format such as MP3, OMG, or WMA for example is generated to be stored in the music file storage block 123. Further, along with the substantial data of content, such information about the content as content attribute information including title, album name, and artist name is stored in the music management information storage block 122. In addition, the right information as content use right information is stored in the right information storage block 121 and such additional information as a jacket image and lyrics data is stored in the additional information storage block 124.

Also, on the basis of a processing request made by the user through the GUI block 111, the music management block 114 executes the recording, update, or deletion of the data stored in the music management information storage block 122 of the data storage block 120, namely, the content information such as the album name, title, and artist name corresponding to the content and the file name corresponding thereto and, at the same time, executes the reading of these pieces of content information.

In addition, in response to a data search request from the GUI block 111, the music management block 114 executes a data search operation on the basis of the information stored in the music management information storage block 122 to read the content attribute information such as album name, artist name, title, and music ID for example as a result of the search operation from the music management information storage block 122, supplying the retrieved content attribute information to the GUI block 111.

In response to a request from the music management block 114 and on the basis of the file name acquired from the music management information storage block 122 of the data storage block 120, the file search block 115 searches for music file storage block 123 for a content storage file corresponding to the file name. The file search block 115 supplies the file retrieved from the music file storage block 123 to the music management block 114.

The music management block 114 supplies the content storage file received from the file search block 115 to the content management processing block 112 or the content transfer processing block 113.

The data storage block 120 contains the right information storage block 121, the music management information storage block 122, the music file storage block 123, and the additional information storage block 124.

The music management information storage block 122 records content-associated data such as music ID, album name, title, artist name, artist initial, content file name, and other kinds of content information, for example. The music management information storage block 122 builds a relational database made up of two or more management tables for example, thereby executing content management. To be more specific, the music management information storage block 122 manages data by use of a plurality of tables such as an album/music table setting albums and music as main management items and a file table setting file names as main management items.

An example of an album/music table is shown in FIG. 3A. The album/music table lists the relationships between items such as ID to be set to album or music, album name, music title, artist name, artist initial, genre name, and music file as shown in FIG. 3A.

ID is an identifier to be set to each album or music and is unique to each album and each piece of music.

Figure 4:
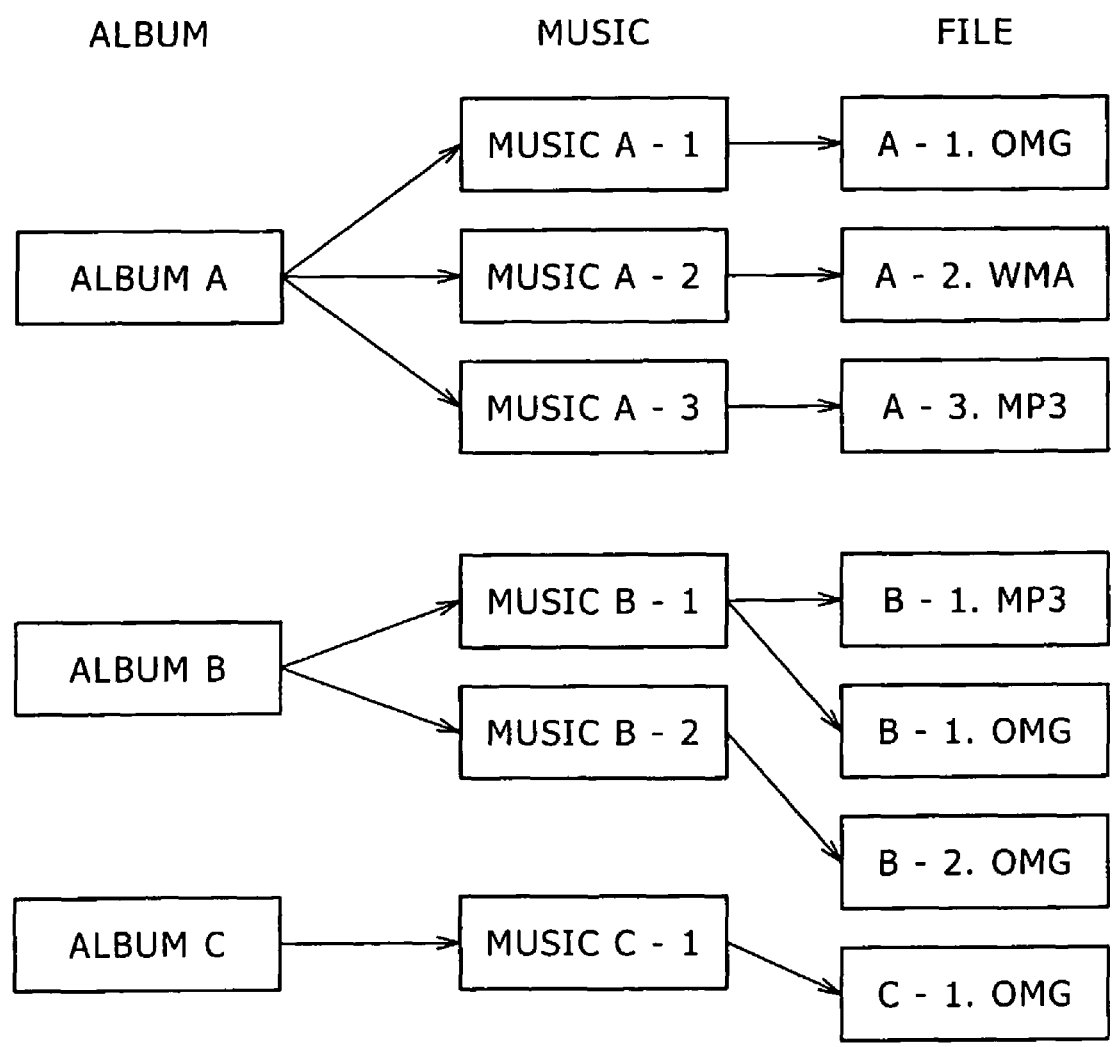
FIG. 4 shows a relationship between albums, music data, and music files.

The following describes the relationship between album, music, and music file with reference to FIG. 4. An album is set as a collection of two or more titles of music created by one artist, for example. However, this conditions is not essential; for example, an album may be made up of only one title of music. Each title of music is set as a child of an album. Each title of music is stored in the music file storage block 123 shown in FIG. 2 as a data file compliant with one of various data formats (OMG, MP3, and WMA for example).

Item "ID" set to the album/music table shown in FIG. 3A is an identifier set for each album or each title of music. As described with reference to FIG. 4, the relation between album and music is parent and child, respectively. The music management information storage block 122 stores an ID correlation table indicative of a parent-child correlation of IDs as shown in FIG. 3B that allows the processing of identifying an album from a music title or identifying a music title from an album. For example, if a search operation based on music ID speciation is executed, referencing the ID correlation table allows the extraction of the album ID corresponding to a music ID to provide album information.

Items set to the album/music table shown in FIG. 3A include "Album or music name", "Artist name", "Artist initial", "Genre name", and "Music file name", in addition to ID.

In the example shown in FIG. 3A, the first entry for example is:
ID=1
Album name=AlbumA
Artist name=Jamiroquai
Artist initial=J
Genre name=Funk
Music file name=none
Each album is a collection of pieces of music and has no music file name.

In the example shown in FIG. 3A, the second entry is:
ID=2
Music title=Song-A
Artist name=Jamiroquai
Artist initial=J
Genre name=Funk
Music file name=C:/Root/Song-A/track.omg
For each piece of music, a music file name stored in the music file storage block 123 is set.

The second entry of FIG. 3A is ID=2 and album ID=1 may be extracted as parent ID from the ID correlation table shown in FIG. 3B. Conversely, it is practicable on the basis of album ID=1 to search for child music, namely, an album for desired music titles.

Referring to FIG. 2 again, the description of the above-mentioned configuration of the information processing apparatus according to the invention will be continued. The music management information storage block 122 stores the above-mentioned content management information. The music file storage block 123 stores files on a piece of music basis. The data format is any of MP3, ATRAC3, OMG, WMA, for example. Sometimes, a same piece of music is stored in different data formats. For example, music B-1 which is a child of album B shown in FIG. 4 is stored in the music file storage block 123 in data formats of B-1.MP3 indicative of MP3 data file and B-1.OMG indicative of OMG data file.

The additional information storage block 124 stores additional data corresponding to content, such as jacket image data, lyrics information, and recording date data, for example.

The right information storage block 121 stores the right information corresponding to each file compliant with the standard specified by SDMI (Secure Digital Music Initiative), for example. Upon reception of a music ID from the music management block 114, the right information storage block 121 searches for one piece of right information corresponding to the received music ID and supplies the retrieved right information to the music management block 114, thereby executing the processing of reproducing content on the content management processing block 112 or the content use control processing on the basis of the right information at the time of content transfer processing in the content transfer processing block 113.

The following describes the actual processing of executing the downloading of content and the transfer of content to external devices as a sequence of processing operations.

Figure 5:
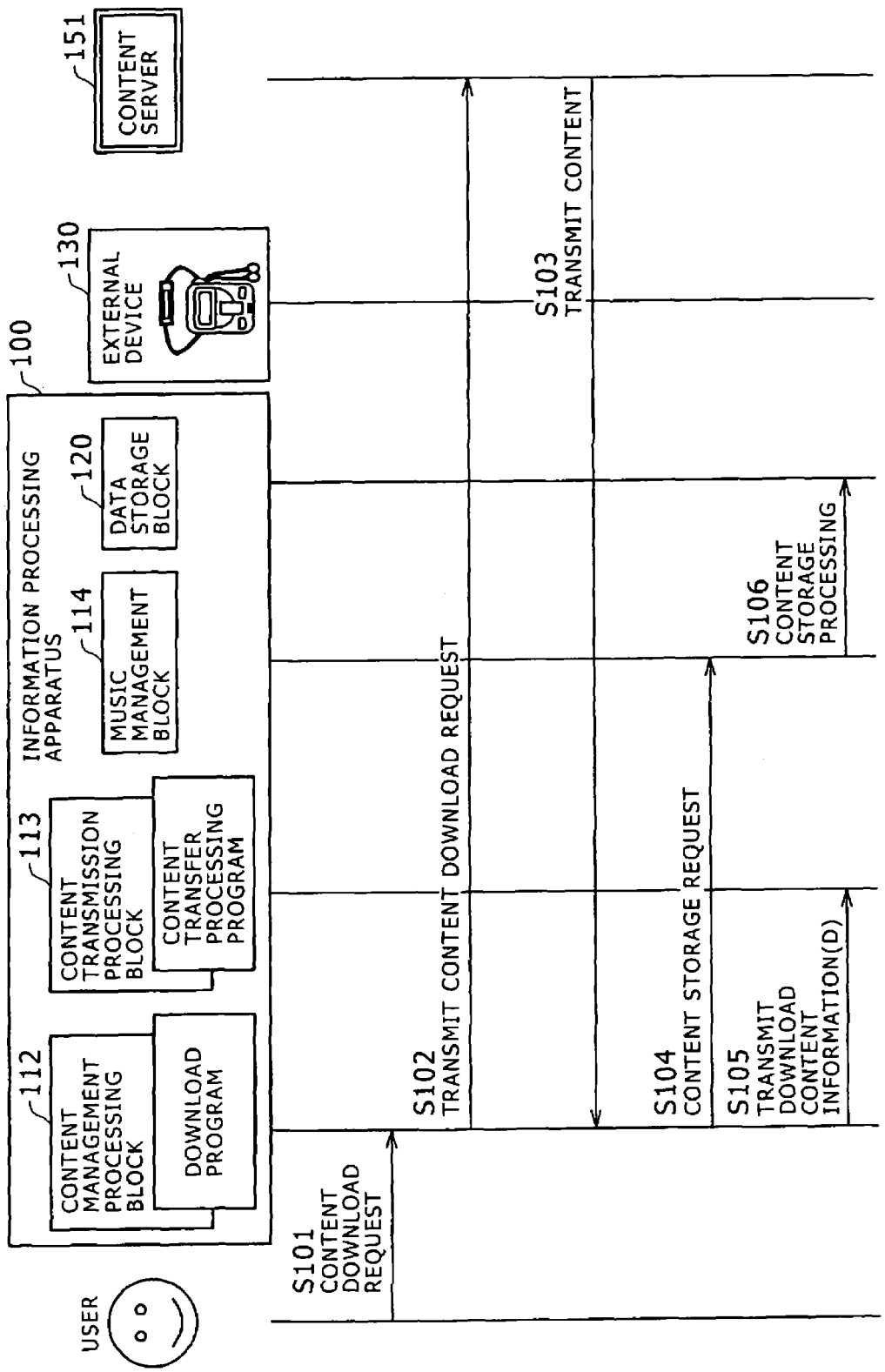
FIG. 5 is a sequence diagram (1) illustrating a processing sequence of downloading and transferring content data.
Figure 6:
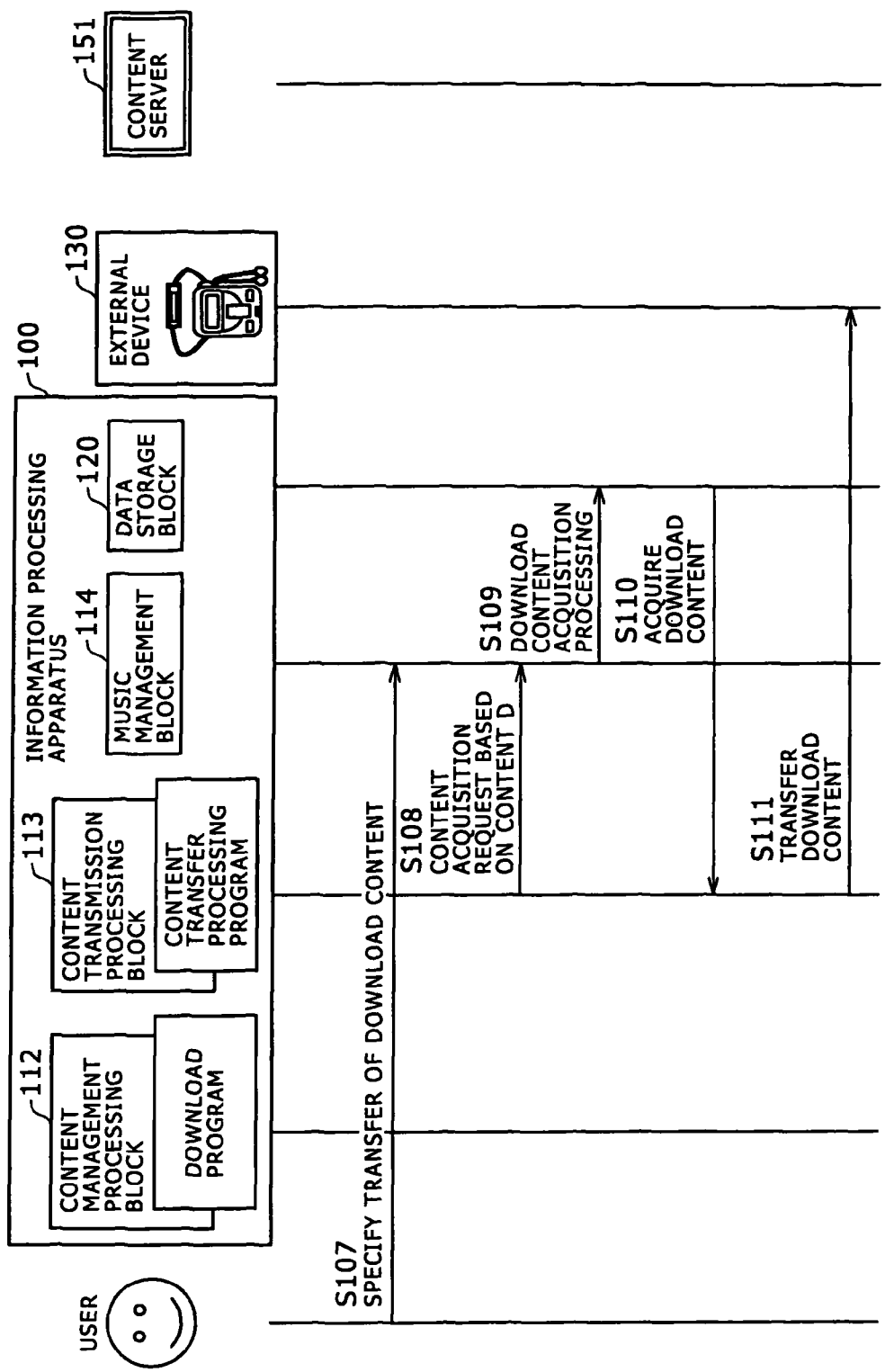
FIG. 6 a sequence diagram (1) illustrating a processing sequence of downloading and transferring content data.

FIGS. 5 and 6 show processing sequence diagrams. Shown in FIGS. 5 and 6 are processing operations to be executed by the user, the information processing apparatus 100, the external device 130 which is a content transfer destination, and the content server 151 which is a download content providing server. It should be noted that the processing to be executed by the information processing apparatus 100 will be described with respect to the content management processing block 112 that executes content download control processing as instructed by a download processing program, the content transfer processing block 113 that executes content transfer control processing for external devices as instructed by a content transfer processing program, the music management block 114 that executes storage and acquisition of content with the data storage block as instructed by the content management processing block 112, the content transfer processing block 113, or a GUI block, not shown, and the data storage block 120 for storing content. The data input from the user is executed through a GUI block, not shown.

Figure 7:
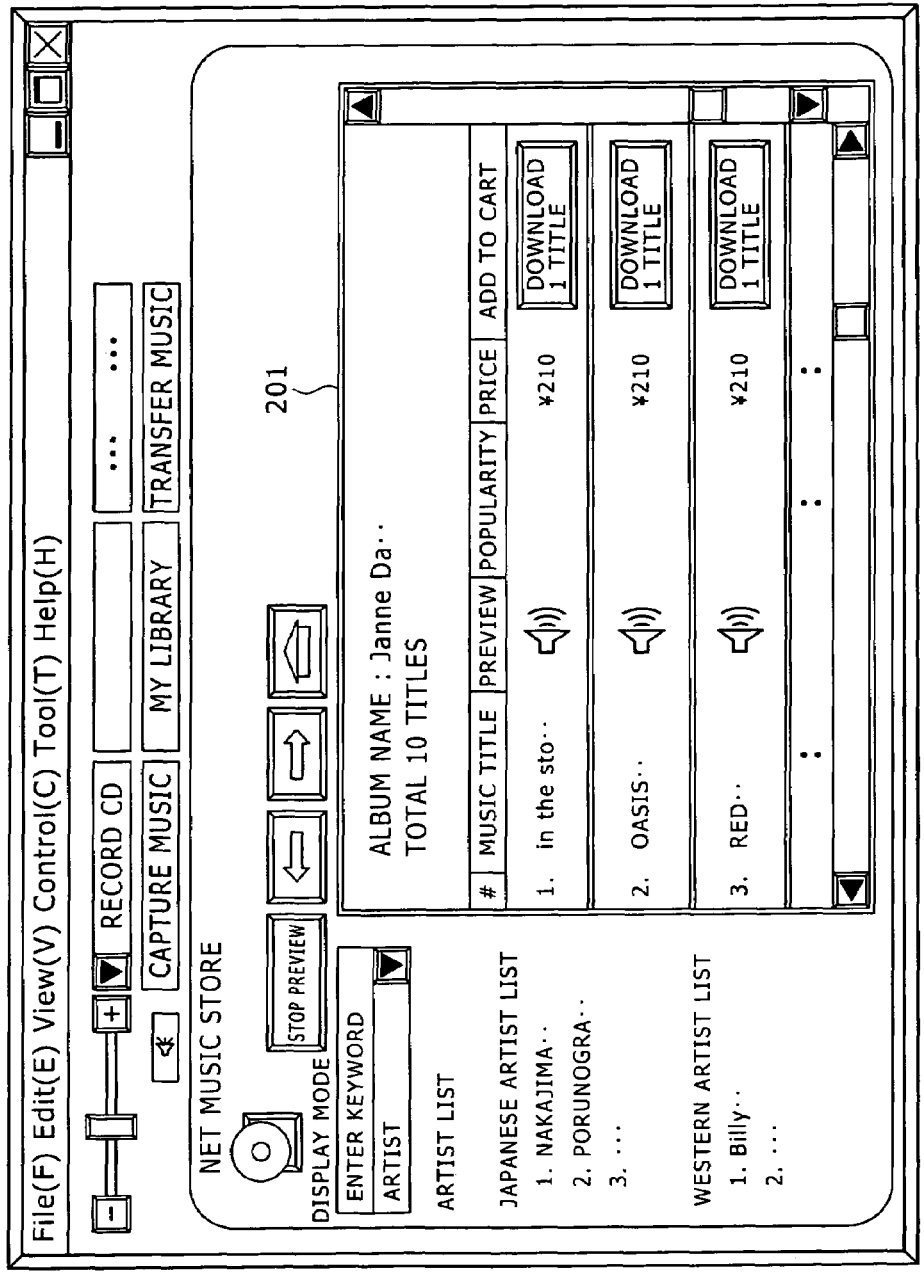
FIG. 7 shows an exemplary screen to be presented when specifying download content.

The following describes details of each of the processing steps shown in FIGS. 5 and 6. In step S101, the user makes a content download request through a content purchase screen displayed on the display monitor under the control of the GUI block. FIG. 7 shows an example of a content purchase screen.

As shown in FIG. 7, the content purchase screen presents list information 201 about content that may be provided from a content providing server (or an EMD server). The user references this list information 201 to select a particular piece of content to be purchased, or to be downloaded. The information about the selection is transmitted to the content server 151 via the communication block 118 (refer to FIG. 2) under the control of the content management processing block 112. This is the processing of step S102 shown in FIG. 5. The information to be transmitted to the content server 151 includes content specification information, a content URL for example. The content server transmits a particular piece of content selected in accordance with the content URL to the information processing apparatus 100 (step S103).

The content management processing block 112 receives the content from the content server 151 through the communication block 118.

Figure 8:
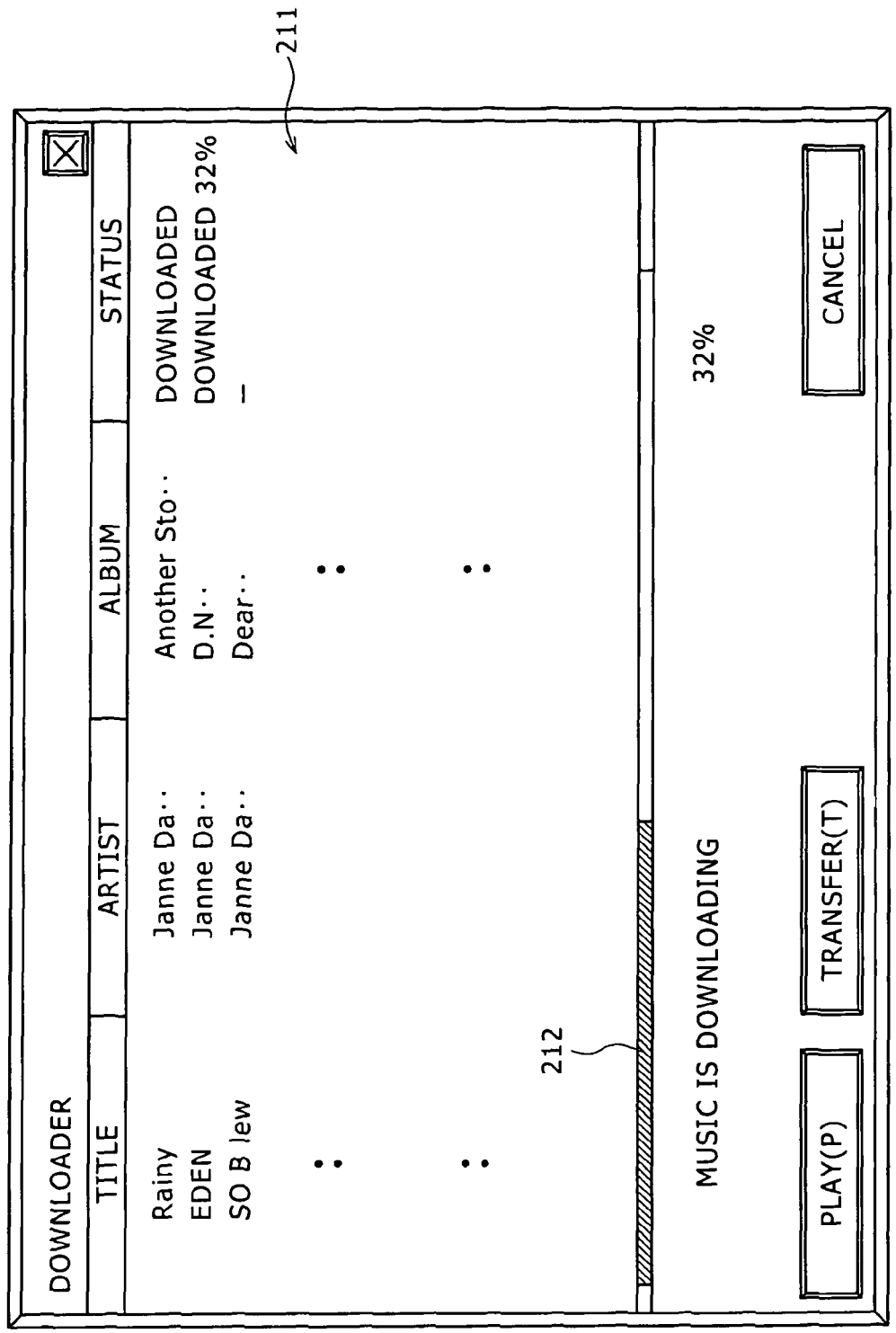
FIG. 8 shows an exemplary screen to be presented when downloading content.

FIG. 8 shows an exemplary screen to be presented on the display monitor through the GUI block 111 during the execution of download processing. As shown in FIG. 8, a download content display screen 211 presents the title, artist, album name, and download status of the content subject to downloading. In addition, an indicator 212 is shown by which the user can check the progress of downloading.

In step S104, the content management processing block 112 passes the received content to the music management block 114, thereby requesting the data storage block 120 for content file storage processing.

Further, in step S105, the content management processing block 112 outputs the content ID of the download content to the content transfer processing block 113. This processing is executed for the download content to be instantly transferable to external devices, which will be described later. Namely, holding the ID of the download content allows the selective transfer of the download content to external devices without executing content search processing.

In step S106, the music management block 114 generates a content file in accordance with a data format such as MP3, OMG, or WMA in response to a content storage request from the content management processing block 112 and stores the generated content file into the music file storage block 123. Further, along with the substantial data of the content, the attribute information thereof, such as music title, album name, and artist name, is stored in the music management information storage block 122. In addition, the right information as the use right information of content is stored in the right information storage block 121 and the additional information such as jacket image data and lyrics data is stored in the additional information storage block 124.

In step S107 shown in FIG. 6, the user makes a download content transfer request through a content transfer processing screen presented on the display monitor of the GUI block 111 under the control of the content transfer processing block 113.

Figure 9:
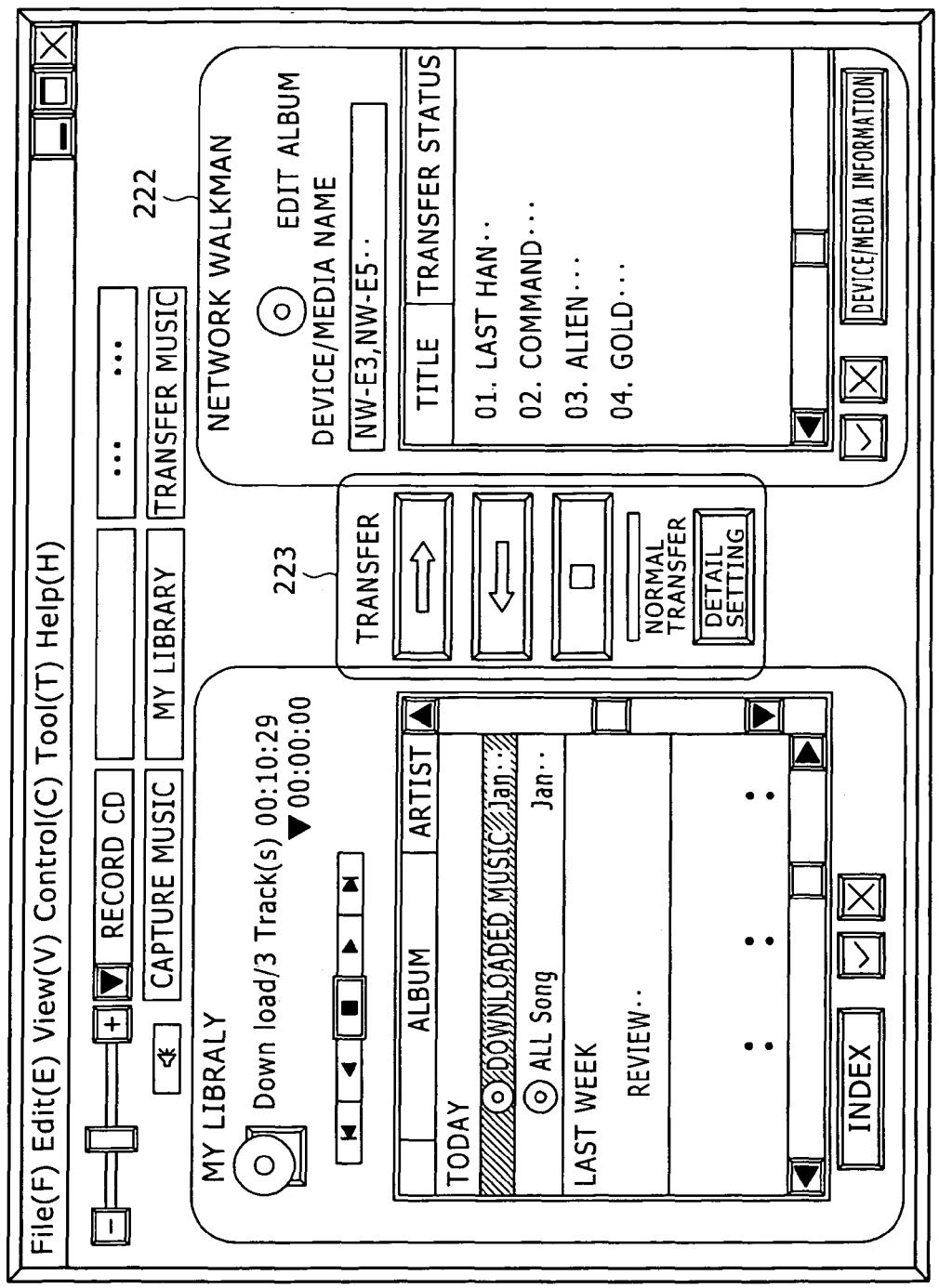
FIG. 9 shows an exemplary screen to be presented when selecting transfer content and specifying a transfer time for content transfer.

FIG. 9 shows an example of a content transfer processing screen the content transfer processing screen presents, on the left side, my library data, namely stored content list information 221, as the list information of the content stored in the data storage block 120 and, on the right side, external device information 222 such as stored content information of a USB-connected external device as transfer destination for example and the device information thereof. It should be noted that the external device 130 includes not only a content player but also a flash memory for example as content storage means, as described before.

At the center of the content transfer processing screen, an operation button 223 for executing transfer processing is displayed. Operating this operation button 223, the user can issue a transfer start command or a transfer cancel command to the content transfer processing block 113 through the GUI block 111. The content transfer processing block 113 executes the processing specified by the user.

It should be noted that the stored content list information 221 on the left side of FIG. 9 shows various kinds of content, namely, list information of the content stored in the data storage block 120 in the form of a list. The user selects a desired piece of content from this list and operates the operation button 223, thereby starting the transfer of the selected piece of content.

In the configuration according to the invention, a piece of music downloaded immediately before is presented to the user in a status in which this piece of music has already been specified as the content subject to transfer. As shown in FIG. 9, an entry 224 in the list, namely, "downloaded music" entry 224, is presented to the user as specified as the content subject to transfer.

The content subject to transfer is obtained by identifying download content by the content transfer processing block 113 on the basis of the content ID corresponding to the download content entered from the content management processing block 112 and the GUI block 111 executes the processing of generating a content transfer screen with this download content set as transferred in step S105 (FIG. 5), thereby presenting the generated content transfer screen on the display monitor.

Only operating the operation button 223 on the transfer processing screen shown in FIG. 9, the user can select the preselected transfer content, namely, the download content, thereby starting the transfer of the selected download content to the external device 130.

Namely, the processing to be executed by the user in step S107 shown in FIG. 6 is only operating the operation button 223 on the transfer processing screen shown in FIG. 9.

Receiving a content transfer request from the user, the content transfer processing block 113 outputs the content ID, namely, the content ID for the download content to the music management block 114 upon reception of the content transfer request from the user, thereby making a content acquisition request in step S108.

In step S109, the music management block 114 acquires a file name corresponding to the content ID from the music management information storage block 122 and makes the file search block 115 execute the file acquisition based on the obtained file name, thereby acquiring a content file from the music file storage block 123. The content file acquired here is the content downloaded in the foregoing download processing. The music management block 114 outputs the acquired music file to the content transfer processing block 113 (step S110).

In step S111, the content transfer processing block 113 outputs the acquired content to the external device 130 via the PD plug-in 117. It should be noted that, before content transfer, the information processing apparatus 100 cross authenticates the external device 130 and, only if the cross authentication is successful, the content transfer is executed.

Figure 10:
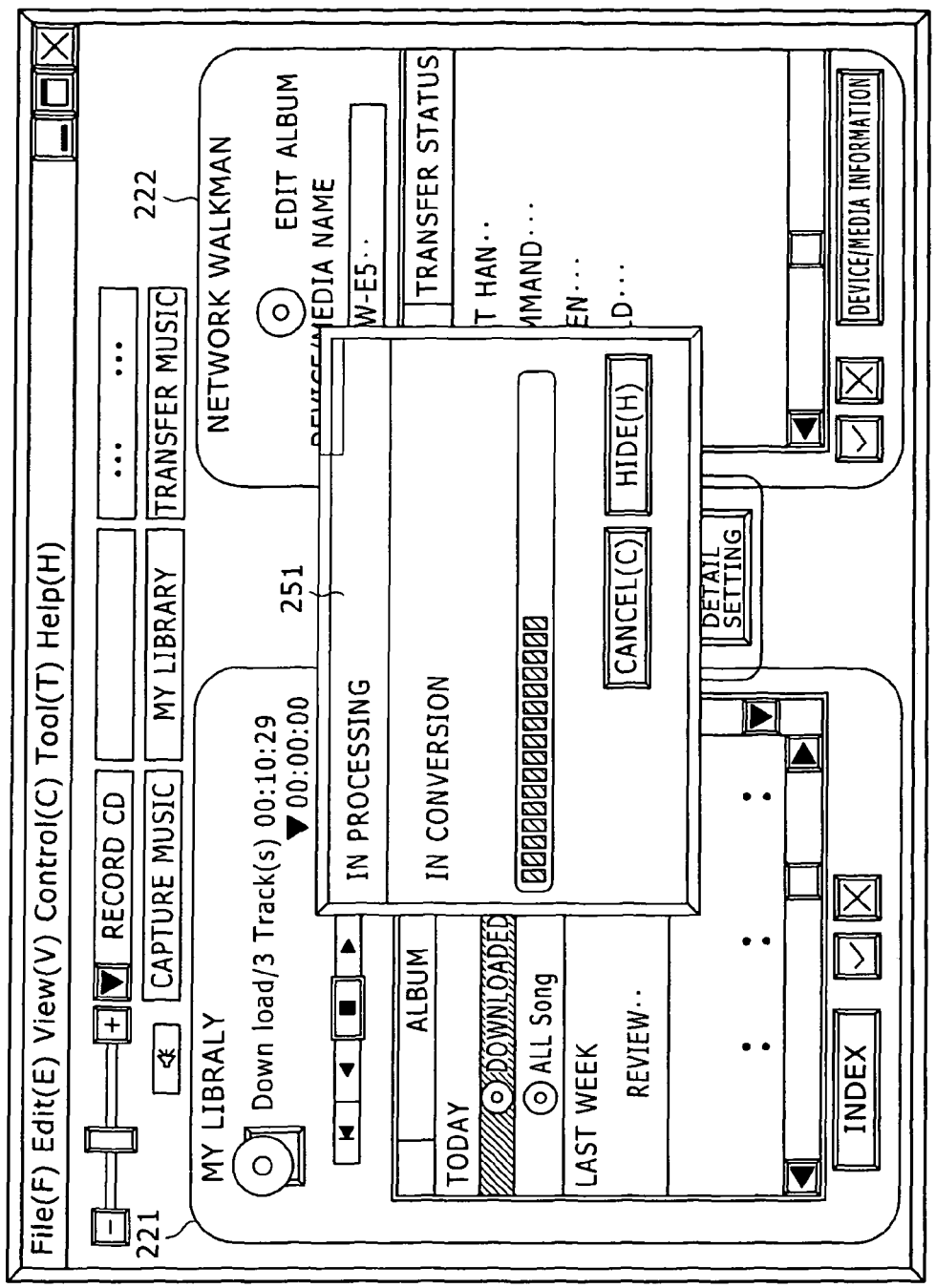
FIG. 10 shows an exemplary screen to be presented during content transfer processing.

FIG. 10 shows an exemplary display screen that is shown on the display monitor when content is transferred. As shown in FIG. 10, the display screen presents a progress status display block 251 indicative of transfer processing. Referring to this display block, the user is able to check how the content transfer processing is going.

The following describes a processing procedure for the information processing apparatus according to the invention to execute content download processing and download content transfer processing as a sequence of processing operations, with reference to the flowchart shown in FIG. 11.

First, in step S201, a content download request specified with download content by URL for example on the basis of the content specification information by the user is outputted to a content server.

In step S202, the content is received from the content server. In step S203, the content ID of the download content is outputted to the content transfer processing block. To be more specific, the content ID of the download content is temporarily stored in memory.

In step S204, the download content is stored in the data storage block under the control of the music management block.

In step S205, the content transfer processing screen (refer to FIG. 9) provided by the content transfer processing block is presented in step S205. As described above, this presentation screen is in the status in which the download content is selected as the content to be transferred.

In step S206, it is determined whether there is a transfer start command from the user. This is the processing of determining whether the operation button 223 has been operated by the user on the screen shown in FIG. 9. If the user is found having executed no user operation within a predetermined period of time, then it is determined not to execute transfer processing, upon which the processing ends. In this case, the screen is returned to the initial screen for example.

If a transfer start command by the user is found in step S206, then the procedure goes to step S207, in which a file acquisition request based on the content ID of the download content is outputted from the content transfer management block to the music management block, thereby acquiring the piece of music acquired by the music management block through the file search block, namely the download content.

In step S208, the content transfer processing block transfers the acquired content to an external device. It should be noted that, as described above, the cross authentication processing is executed before starting the transfer processing.

Thus, in the configuration according to the invention, the content download processing and the processing of transferring selected download content to external devices are executable as a sequence of processing operations. Therefore, the user need not execute the processing of selecting and extracting download content, thereby realizing efficient content downloading and transfer.

It should be noted that, in the above-mentioned embodiment, the transfer of download content to an external device is started by a user command by way of example; it is also practicable to automatically execute the transfer of download content without user command. In this case, step S107 in the sequence diagram shown in FIG. 6 and step S206 shown in the flowchart of FIG. 11 are skipped.

In the above-mentioned example, download content is set to be transferred to an external device; it is also practicable to store download content an information recording medium such as a CD in which, as with the above-mentioned processing, download content is set as content to be written to an information recording medium on the basis of the content ID, thereby efficiently executing content write processing.

To be more specific, an execution screen for writing content to an information recording medium such as a CD is also used to present a list of writable content like the list of transferable content described with reference to FIG. 9, present a screen with download content set as content to be written, acquire a content file data on the basis of the content ID acquired at the time of downloading, and execute the processing of writing the acquired content to the information recording medium. This allows the user only to specify the execution of writing to selectively write download content.

Namely, in content write processing, the user need not search for download content and select retrieved content, resulting in efficient data write processing.

The following describes an exemplary hardware configuration of the information processing apparatus that executes the above-mentioned processing, with reference to FIG. 12.

A CPU (Central Processing Unit) 501 is a control block for executing processing as instructed by an OS (Operating System) and various computer application programs including content recording/reproducing processing, content download processing, and content transfer processing programs.

A ROM (Read Only Memory) 502 stores programs and operation parameters for use by the CPU 501. A RAM (Random Access Memory) 503 stores programs for use by the CPU 501 and parameters that change from time to time during the execution by the CPU. These components are interconnected with a host bus 504 based on a CPU bus.

The host bus 504 is connected with an external bus 506 such as PCI a (Peripheral Component Interconnect/Interface) bus via a bridge 505.

A keyboard 508 is operated by the user when entering various commands into the CPU 501. A pointing device 509 is operated by the user when specifying and selecting a point on a screen shown in a display monitor 510. The display monitor 510, made up of a liquid crystal display device or a CRT (Cathode Ray Tube), displays various kinds of information in the form of text and image. A HDD (Hard disk Drive) 511 drives a hard disk to record or reproduce programs to be executed by the CPU 501 and information.

A drive 512 reads data or programs from a loaded removable recording medium 521 such as magnetic disk, an optical disk, a magneto-optical disk, or a semiconductor memory and supplies the read data or programs to the RAM 503 connected via an interface 507, the external bus 506, a bridge 505, and the host bus 504.

A connection port 514 is used to connect an externally connected device 522 such as a player for example and has connection blocks such as USB and IEEE 1394 for example. The connection port 514 is connected to the CPU 501 and so on via the interface 507, the external bus 506, the bridge 505, and the host bus 504.

A communication block 515, connected to a network, executes the processing associated with the transmission of data supplied from the CPU 501 or the HDD 511 for example and the reception of data from a server. For example, this communication block executes the acquisition of content and the communication at the time of content information acquisition.

The present invention has been described hereinbefore with reference to specified embodiments. However, it is obvious that changes and variations are able to be made without departing from the spirit or scope of the following claims by those skilled in the art. In other words, since the present invention has been disclosed by explaining with examples, the present description should not be interpreted to a limited extent. The substance of the present invention should be understood by following the claims.

The above-mentioned sequence of processing operations may be executed by software as well as hardware. When the above-mentioned sequence of processing operations is executed by software, the programs constituting the software are installed in a computer which is built in dedicated hardware equipment or installed into a general-purpose personal computer for example in which various programs may be installed for the execution of various functions.

For example, programs can be recorded to a hard disk or a ROM (Read Only Memory) as a recording medium in advance. Alternatively, programs can be stored (or recorded) in removable recording media such as flexible disk, CD-ROM (Compact Disc Read Only Memory), MO (Magneto Optical) disk, DVD (Digital Versatile Disc), magnetic disk, and semiconductor memory on a temporary or permanent basis. These removable recording media can be provided as so-called package software.

It should be noted that, in addition to the installation from removable recording media such as mentioned above into a computer, programs may be downloaded from a download site into a computer in a wireless manner or via a network such as LAN (Local Area Network) or the Internet in a wired manner. The computer receives downloaded programs and records them into incorporated recording media such as a hard disk.

It should be noted herein that the steps for describing each program recorded in recording media include not only the processing operations which are sequentially executed in a time-dependent manner but also the processing operations which are executed concurrently or discretely. It should also be noted that term "system" as used herein denotes a logical set of a plurality of component units and these component units are not necessary accommodated in a same housing.

INDUSTRIAL APPLICABILITY

As described and according to the invention, the above-described configuration allows the execution of the processing of downloading content from a content server, the processing of transferring the downloaded content to an external device such as a portable device, and the processing of writing data to an information recording medium such as a CD as a sequence of processing operations, thereby providing significantly efficient content download and content transfer or content write processing operations. Consequently, applying the present invention to information processing apparatuses that executes content download and transfer processing operations can significantly enhance user convenience.

Further, according to the above-described configuration of the invention, in downloading content, a content identifier thereof is acquired, a particular piece of content subject to transfer to an external device is identified on the basis of the acquired content identifier, the identified content is retrieved from a data storage block, and the retrieved content is transferred to the external device or written to an information recording medium, so that the processing of content downloading, the processing of content transfer to an external device and content writing to an information recording medium can be executed as a sequence of processing operations, thereby providing significantly efficient content download and content transfer or content write processing operations. Consequently, applying the present invention to information processing apparatuses that executes content download and transfer processing operations can significantly enhance user convenience.

Still further, according to the above-described configuration of the invention, in display data with the information about the content transferable to external devices or the information about the content writable to information recording media set in the form of a list, the displaying of a list with the entries corresponding to download content set as transfer-specified content or write-specified content beforehand is executed, so that download content search processing need not be executed, thereby enabling significantly efficient processing. Consequently, applying the present invention to information processing apparatuses that executes content download and transfer processing operations can significantly enhance user convenience.

The invention claimed is:

1. An information processing apparatus, comprising:
   a network communication unit configured to download first content data from an external server over a communication network;
   a memory configured to store the first content data downloaded from the external server and second content data read locally from an information recording medium;
   a control unit configured
      to automatically register, without user operation, identification information of the downloaded first content data to a first content group, and
   to control a display unit to display a first graphical representation of the first content group and a second graphical representation of a second content group including identification information of the second content data, the second graphical representation being different from the first graphical representation; and
   a communication unit configured to communicate with an information reproducing apparatus, and to transfer to the information reproducing apparatus the downloaded first content data by selecting the downloaded first content data corresponding to the identification information included in the first content group.

2. The information processing apparatus according to claim 1, wherein
   the control unit is configured to register, in response to user operation, the identification information of the downloaded first content data stored in the information processing apparatus to the first content group.

3. The information processing apparatus according to claim 1, wherein
the first content group is a list of the downloaded first content data.

4. The information processing apparatus according to claim 1, wherein
the first and second content data are music data.

5. The information processing apparatus according to claim 1, wherein
the second content group is a list of all songs stored in the information processing apparatus.

6. The information processing apparatus according to claim 1, wherein
the control unit is configured to control the display unit to display a button, and to control the communication unit to transfer the downloaded first content data in response to an operation of the button.

7. The information processing apparatus according to claim 2, further comprising:
a disc drive configured to read a disc, and wherein
the control unit is configured to control the disc drive to read data from the disc and to control the memory to store the read data as the second content data.

8. The information processing apparatus according to claim 1, wherein
the control unit controls the display unit to display a list of the content data stored in
the information reproducing apparatus when the information reproducing apparatus is connected to the information processing apparatus.

9. The information processing apparatus according to claim 1, wherein
the control unit is configured
to control the network communication unit to download sample data of the first content data, and
to control reproduction of the sample data.

10. The information processing apparatus according to claim 1, wherein
the control unit is configured
to control the network communication unit to receive a price of the first content data, and
to control the display unit to display the price of the first content data.

11. The information processing apparatus according to claim 1, wherein
the control unit is configured
to control the network communication unit to receive a popularity of the first content data, and
to control the display unit to display the popularity of the first content data.

12. The information processing apparatus according to claim 1, wherein
the identification information of the downloaded first content data is at least one of title, artist name, and album name.

13. The information processing apparatus according to claim 1, wherein
the control unit is configured to control the display unit to display information of the downloaded first content data that is transferable to the information reproducing apparatus based on the first content group, to set an entry corresponding to the downloaded first content data to the first content group, and to execute a display operation with the entry set as transfer-specified content beforehand.

14. The information processing apparatus according to claim 1, wherein
the control unit is configured to store the downloaded first content data into the memory, to acquire the downloaded first content data from the memory on the basis of the identification information of the downloaded first content data registered to the first content group, and to transfer the acquired downloaded first content data to the information reproducing apparatus.

15. The information processing apparatus according to claim 1, wherein
the control unit is configured to acquire the downloaded first content data from the memory on the basis of the identification information of the downloaded first content data registered to the first content group, and to transfer the acquired downloaded first content data to the information reproducing apparatus under a condition of a user transfer instruction input.

16. The information processing apparatus according to claim 1, wherein
the control unit is configured to acquire the downloaded first content data from the memory on the basis of the identification information of the downloaded first content data registered to the first content group, and to transfer the acquired downloaded first content data to the information reproducing apparatus regardless of a user transfer instruction input.

17. The information processing apparatus according to claim 1, wherein
the control unit includes
a content management processing block configured to execute content data download processing;
a content transfer processing block configured to execute content data transfer processing; and
a music management block configured to store the first and second content data into the memory and to acquire the first and second content data from the memory,
said content management processing block being configured to output the identification information corresponding to the downloaded first content data to said content transfer processing block, and
said content transfer processing block being configured to output the identification information to said music management block, to acquire the downloaded first content data corresponding to said identification information from said music management block, and to transfer the acquired downloaded first content data to the information reproducing apparatus.

18. The information processing apparatus according to claim 1, wherein
the control unit is configured to acquire a content file name on the basis of the identification information of the downloaded first content data and to acquire a content file corresponding to the downloaded first content data stored in the memory, on the basis of said content file name.

19. The information processing apparatus according to claim 1, wherein
the control unit is configured to identify content data to be written to another information recording medium on the basis of said identification information of the downloaded first content data.

20. The information processing apparatus according to claim 19, wherein
the control unit is configured to control the display unit to display information about content data writable to another information recording medium set as the first content group, to set an entry corresponding to the downloaded first content data to said first content group, and to execute a display operation with said entry set as write-specified content beforehand.

21. A non-transitory computer-readable storage medium having embedded therein instructions, which when executed by a processor, cause the processor to perform a method of an information processing apparatus for downloading and transferring first content data, comprising:

downloading, by a network communication unit, the first content data from an external server over a communication network;

storing, in a memory configured to store second content data read locally from an information recording medium, the first content data downloaded from the external server;

automatically registering, by a control unit and without user operation, identification information of the downloaded first content data to a first content group;

controlling, by the control unit, a display unit to display a first graphical representation of the first content group and a second graphical representation of a second content group including identification information of the second content data, the second graphical representation being different from the first graphical representation; and transferring, by a communication unit configured to communicate with an information reproducing apparatus, to the information reproducing apparatus the downloaded first content data by selecting the downloaded first content data corresponding to the identification information included in the first content group.

22. The non-transitory computer-readable storage medium according to claim 21, further comprising:

registering, by the control unit and in response to user operation, the identification information of the downloaded first content data stored in the information processing apparatus to the first content group.

23. The non-transitory computer-readable storage medium according to claim 21, wherein
   the first content group is a list of the downloaded first content data.

24. The non-transitory computer-readable storage medium according to claim 21, wherein
   the first and second content data are music data.

25. The non-transitory computer-readable storage medium according to claim 21, wherein
   the second content group is a list of all songs stored in the information processing apparatus.

26. The non-transitory computer-readable storage medium according to claim 21, further comprising:
   controlling the display unit to display a button; and
   controlling the communication unit to transfer the downloaded first content data in response to an operation of the button.

27. The non-transitory computer-readable storage medium according to claim 22, further comprising:
   controlling a disc drive, configured to read a disc, to read data from the disc; and
   controlling the memory to store the read data as the second content data.

28. The non-transitory computer-readably storage medium according to claim 21, wherein
   the controlling step comprises controlling the display unit to display a list of the content data stored in the information reproducing apparatus when the information reproducing apparatus is connected to the information processing apparatus.

29. The non-transitory computer-readable storage medium according to claim 21, further comprising:
   controlling the network communication unit to download sample data of the first content data, and
   controlling reproduction of the sample data.

30. The non-transitory computer-readable storage medium according to claim 21, further comprising:
   controlling the network communication unit to receive a price of the first content data; and
   controlling the display unit to display the price of the first content data.

31. The non-transitory computer-readable storage medium according to claim 21, further comprising:
   controlling the network communication unit to receive a popularity of the first content data, and
   controlling the display unit to display the popularity of the first content data.

32. The non-transitory computer-readable storage medium according to claim 21, wherein
   the identification information of the downloaded first content data is at least one of title, artist name, and album name.

33. The non-transitory computer-readable storage medium according to claim 21, wherein
   the first content group is a list of content transferable to the information reproducing apparatus.

34. The non-transitory computer-readable storage medium according to claim 21, wherein
   the transferring step comprises acquiring the downloaded first content data from the memory on the basis of the identification information of the downloaded first content data registered to the first content group, and transferring the acquired downloaded first content data to the information reproducing apparatus.

35. The non-transitory computer-readable storage medium according to claim 21, further comprising:
   detecting a user transfer instruction input, wherein
   the transferring step comprises acquiring the downloaded first content data from the memory on the basis of the identification information of the downloaded first content data registered to the first content group, and transferring the acquired downloaded first content data to the information reproducing apparatus, under a condition of the user transfer instruction input.

36. The non-transitory computer-readable storage medium according to claim 21, further comprising:
   acquiring a content file name on the basis of the identification information corresponding to the downloaded first content data; and
   acquiring a content file corresponding to the downloaded first content data stored in
   the memory on the basis of said content file name.

37. The non-transitory computer-readable storage medium according to claim 21, further comprising:
   identifying the downloaded first content data to be written to another information recording medium on the basis of the identification information of the downloaded first content data registered to the first content group.

38. The non-transitory computer-readable storage medium according to claim 37, wherein
   the first content group is a list of content writable to the other information recording medium,
   an entry corresponding to the downloaded first content data registered in the first content group is set, and a display operation with said entry set as write-specified content is executed beforehand.

39. A method of an information processing apparatus for downloading and transferring first content data, comprising:

downloading, by a network communication unit of the information processing apparatus, the first content data from an external server over a communication network;

storing, in a memory configured to store second content data read locally from an information recording medium, the first content data downloaded from the external server;

automatically registering, by a control unit of the information processing apparatus and without user operation, identification information of the downloaded first content data to a first content group;

controlling, by the control unit, a display unit to display a first graphical representation of the first content group and a second graphical representation of a second content group including identification information of the second content data, the second graphical representation being different from the first graphical representation; and transferring, by a communication unit configured to communicate with an information reproducing apparatus, to the information reproducing apparatus the downloaded first content data by selecting the downloaded first content data corresponding to the identification information included in the first content group.

* * * * *